(12) United States Patent
Åkerberg

(10) Patent No.: US 6,553,078 B1
(45) Date of Patent: Apr. 22, 2003

(54) ANTENNA SWITCHING DIVERSITY

(75) Inventor: Dag Eison Åkerberg, Kungslingen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/236,011

(22) Filed: Jan. 22, 1999

(30) Foreign Application Priority Data

Jan. 23, 1998 (SE) ............................................... 9800201

(51) Int. Cl.[7] .................................................. H04B 7/00
(52) U.S. Cl. ....................................................... 375/267
(58) Field of Search ................................ 375/267, 347, 375/219; 370/342, 347, 321, 337, 319, 344, 328, 334; 455/132, 133, 562, 69, 277.1, 277.2, 73

(56) References Cited

U.S. PATENT DOCUMENTS

| 5,134,710 A | 7/1992 | Åkerberg ..................... 455/54.1 |
| 5,617,412 A | 4/1997 | Delprat et al. ............... 370/281 |
| 5,628,052 A * | 5/1997 | DeSantis et al. ............ 455/33.3 |
| 5,999,826 A * | 12/1999 | Whinnett ..................... 455/562 |
| 6,085,076 A * | 7/2000 | Lindsay et al. ........... 455/277.1 |
| 6,188,915 B1 * | 2/2001 | Martin et al. ................ 455/562 |
| 6,366,568 B1 * | 4/2002 | Bolgiano et al. ............ 370/320 |

FOREIGN PATENT DOCUMENTS

| GB | 2 262 863 | 6/1993 | ............ H04B/7/08 |
| WO | 94/08404 | 4/1994 | ............ H04B/7/08 |
| WO | 96/02984 | 2/1996 | ............ H04B/7/08 |
| WO | 97/21287 | 6/1997 | ............ H04B/7/26 |

* cited by examiner

Primary Examiner—Don N. Vo
Assistant Examiner—Dung X. Nguyen

(57) ABSTRACT

An antenna switching diversity radio communication system includes a base station and a radio terminal. Transmission and reception are separated in both time and frequency in both the base station and the radio terminal. Reception quality uplink is measured on a set of several antennas belonging to the base station. The base station stores and later retrieves this quality measurement for selecting one of the antennas for uplink reception. The radio terminal measures and reports downlink reception quality to the base station, which stores this information to later select one of the antennas for downlink transmission.

10 Claims, 3 Drawing Sheets

ANTENNA SWITCHING DIVERSITY

The present invention relates generally to space diversity in radio communication systems. In particular the invention relates to an antenna switching diversity system and radio base stations and radio terminals in such a system.

BACKGROUND

Antenna switching diversity is a special form of space diversity in radio communication systems. It provides the possibility to switch to another antenna if reception is bad.

The DECT (Digital Enhanced Cordless Telecommunications) system, which is a TDMA-TDD (Time Division Multiple Access-Time Division Duplex) system, provides both downlink and uplink antenna switching diversity by selecting one out of two available antennas in the base station for both transmission and subsequent reception. Since transmission and reception is on the same frequency in DECT, the uplink fading is the same as the downlink fading, which implies that the same antenna is preferred for both links.

The GSM and D-AMPS systems, which are TDMA-FDD (Time Division Multiple Access-Frequency Division Duplex) systems, on the other hand, provide only uplink space diversity, which often results in bad reception quality at the mobile terminal. In these systems it is not possible to use one out of two antennas for both uplink and downlink reception and transmission, respectively, since the base station transmits and receives simultaneously. In fact GSM and D-AMPS base stations typically use two antennas for uplink reception and a third antenna for downlink transmission. However, it would be desirable to provide downlink antenna switching diversity for TDMA-FDD systems, such as the GSM and D-AMPS systems.

Furthermore, WO 97/21287 (ADVANCED MICRO DEVICES) describes a combined TDMA-TDD/FDD system. It would be desirable to provide this system with both uplink and downlink antenna switching diversity.

SUMMARY

Accordingly it is an object of the present invention to provide a modified TDMA-FDD radio communication system with downlink antenna switching diversity.

It is also an object of the present invention to provide a TDMA-TDD/FDD radio communication system with both downlink and uplink antenna switching diversity.

Another object of the invention is a base station that is modified to fit into such radio communication systems.

Still another object of the invention is a radio terminal that is modified to fit into a modified TDMA-FDD radio communication system as well as a traditional system.

These objects are achieved in accordance with the enclosed claims.

Briefly, the present invention separates transmission from reception both in frequency and time and in both base station and radio terminal. The base station measures uplink reception quality and determines and uses the best antenna for reception. The radio terminal determines reception quality downlink and reports this quality to the base station, which switches transmission antenna for the next transmission if the downlink reception quality is low and maintains the present antenna if it is high. Thus uplink and downlink antenna switching is determined independently for the uplink and downlink. Such a modified system will increase reception quality downlink.

BRIEF DESCRIPTION OF THE DRAWINGS

The invention, together with further objects and advantages thereof, may best be understood by making reference to the following description taken together with the accompanying drawings, in which.

DETAILED DESCRIPTION

For the purposes of this description the following terminology will be used:

A downlink frame is a collection of time slots (bursts) transmitted from a base station to a set of terminals. A terminal may be either stationary or mobile.

An uplink frame is a collection of time slots transmitted from these terminals to the base station.

A duplex frame is the combination of the downlink and uplink frames.

Figure 1:
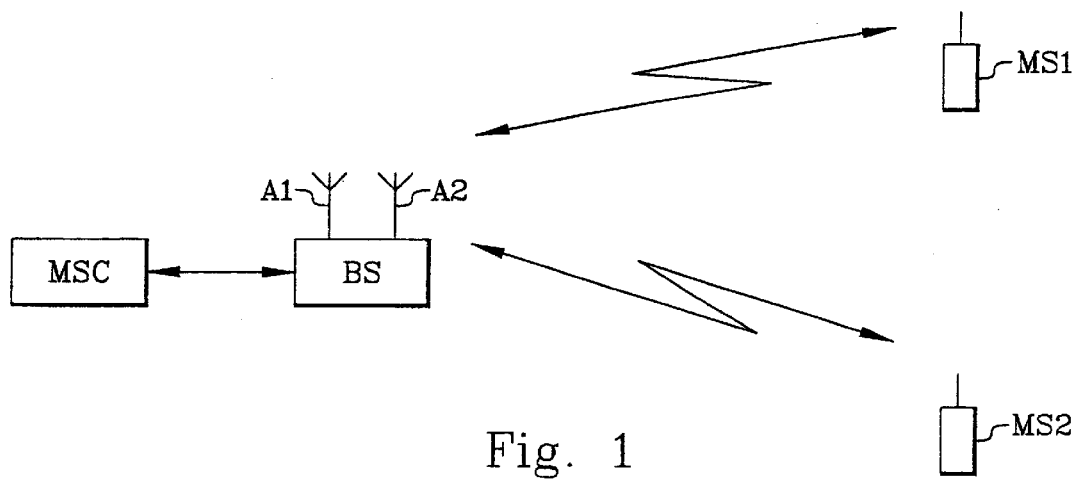
FIG. 1 schematically shows a cellular mobile radio communication system.

FIG. 1 schematically shows a part of a cellular mobile radio communication system. A network controller or mobile services switching center MSC is connected to a base stations BS. Base station BS is in radio contact with mobile stations MS1 and MS2. Base station BS is provided with two antennas A1 and A2. The present invention is primarily concerned with the usage of these antennas for providing both uplink and downlink antenna switching diversity.

Figure 2:
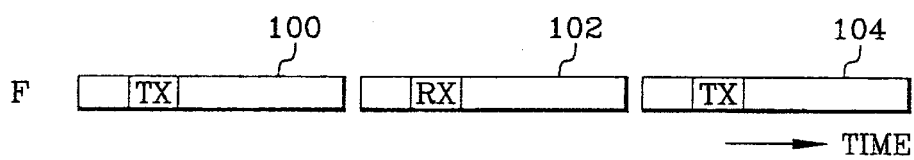
FIG. 2 schematically shows the usage of a carrier frequency in a TDMA-TDD system.

FIG. 2 schematically shows the usage of a carrier frequency in a prior art TDMA-TDD system. A base station BS transmits downlink to mobile station MS1 in a time slot marked TX in a downlink frame 100 on a carrier frequency F. Mobile station MS1 transmits uplink to base station BS1 in a time slot marked RX in an uplink frame 102 (the slot is marked RX to indicate that during this time slot the base station operates as a receiver) on the same carrier frequency F. Downlink frames and uplink frames 100, 102 together form a duplex frame. Downlink frame 104 is the first part of the next duplex frame, in which this pattern is repeated. It is noted that time slots TX and RX have the same position relative to the beginning of their respective frame (downlink and uplink). The "Digital Enhanced Cordless Telecommunications" system (DECT) standardized by the European Telecommunications Standards Institute uses TDMA-TDD for radio communication. In DECT, transmission is synchronized between all base stations, i.e. all downlink transmission occurs during a first 5 ms downlink frame and all uplink transmission occurs during a subsequent 5 ms uplink frame. On one carrier frequency 5 ms are dedicated to 12 downlink time slots and subsequent 5 ms are dedicated to 12 uplink time slots, enabling the use of one single carrier frequency for both downlink and uplink communication of the same bi-directional connection. From DECT it is known to have uplink and downlink diversity using two antennas A1 and A2 in a radio base station BS and one antenna in a mobile radio terminal MS. Since up- and downlink transmission is on the same frequency the selection of the antenna is the same for uplink and downlink. The type of space diversity used is antenna switching diversity, i.e. there is only one radio in the base station receiving/transmitting on the selected antenna. In the uplink, quality of reception is measured by the base station at the beginning of or during the digital uplink time slot, and this quality measure is stored in a channel associated memory position M1a. In the downlink, quality of reception is measured by the mobile station using received Bit Error Rate as a criterion and the mobile station then sends an uplink bit in the following uplink time slot, informing the base station of the downlink quality. The base station also stores this bit in a memory M1b and uses the information bits M1a, M1b to determine the most recent quality "Qr" of the transmission channel (which is the same in both directions since the same frequency is used uplink and downlink) when selecting one of the two antennas for TDD transmission or reception.

Figure 3:
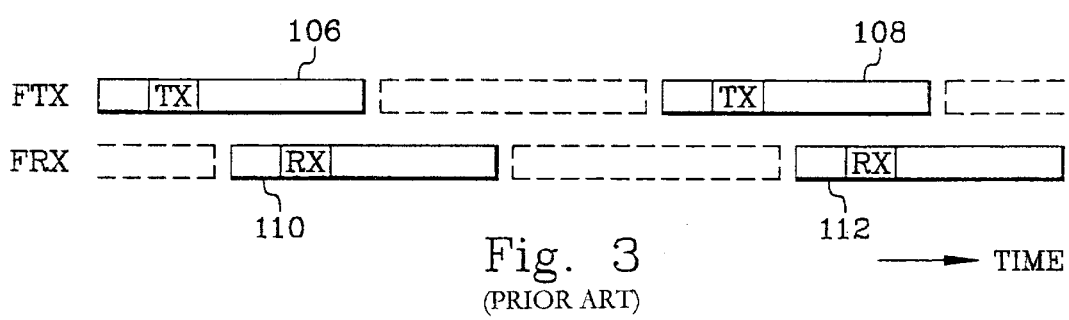
FIG. 3 schematically shows the usage of two carrier frequencies in two non-overlapping frequency bands in a TDMA-FDD system.

FIG. 3 schematically shows the usage of two carrier frequencies in a prior art TDMA-FDD system, such as the GSM system. In this case downlink transmission is separated from uplink transmission by performing the two tasks on different carrier frequencies FTX and FRX. In this case the duplex connections is formed by the repeated downlink and uplink frame pairs (106, 110), (108, 112). Note that the uplink frames are delayed (3 time slots in GSM) with respect to the downlink frames of the same duplex connection (a half rate channel in his case; the dashed frames are used by other duplex connections). In GSM the base station typically uses three antennas, one for downlink transmission and two for uplink reception. The two reception antennas provide uplink antenna space diversity, but the single transmission antenna can not provide downlink space diversity. The reason that separate antennas are used for transmission and reception is that transmission and reception occurs simultaneously in the base station in GSM.

Figure 4:
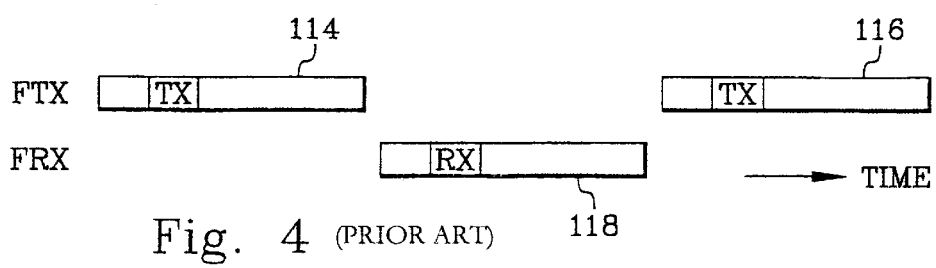
FIG. 4 schematically shows the usage of two carrier frequencies in two non-overlapping frequency bands in a combined TDMA-TDD/FDD system.

FIG. 4 schematically shows the usage of two carrier frequencies in a prior art TDMA-TDD/FDD system, described in WO 97/21287 (ADVANCED MICRO DEVICES). As in TDMA-FDD downlink transmission is separated from uplink transmission by performing the two tasks on different carrier frequencies FTX and FRX. However, this combined system also resembles a TDMA-TDD system since downlink and uplink frames are also separated in time in the same way as in a TDMA-TDD system. A duplex frame is formed by downlink frame 114 and uplink frame 118. Downlink frame 116 is the first part of the next duplex frame. Antenna switching diversity is not discussed in WO 97/21287.

A comparison of FIG. 3 and FIG. 4 reveals that if the system in FIG. 3 is modified so that the dashed frames are eliminated and the delay of 3 time slots is increased to 8 time slots (in GSM), one would in fact obtain a system in accordance with FIG. 4. In such a modified system it would be possible to implement both downlink and uplink antenna switching diversity, since the base station would no longer transmit and receive simultaneously.

The basic principles of the present invention will now be described with reference to FIGS. 5–7.

Figure 5:
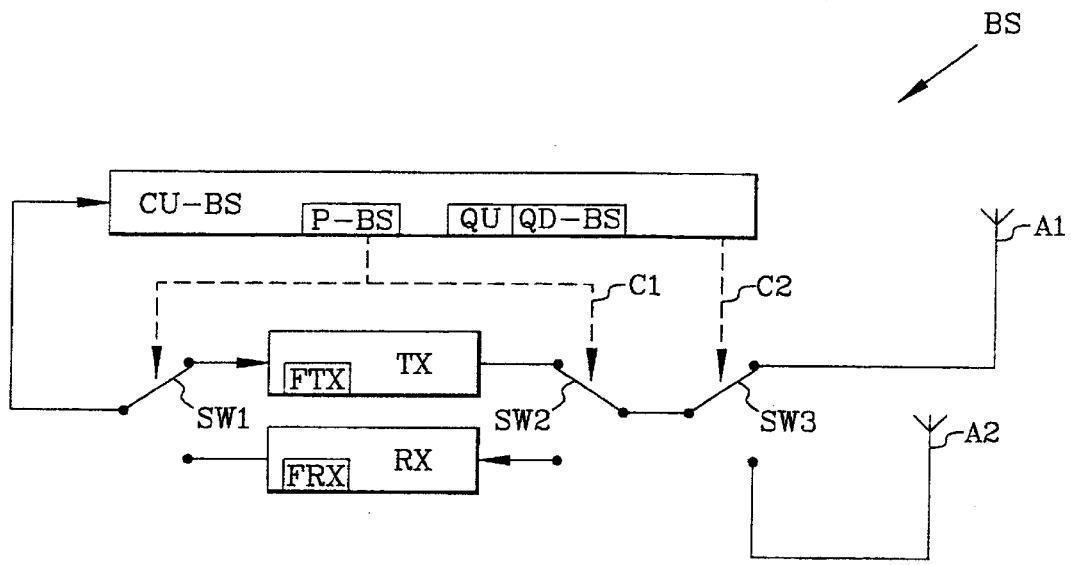
FIG. 5 is a block diagram of a base station in accordance with the present invention.

FIG. 5 is a block diagram of a base station in accordance with the present invention. Only the most essential blocks for explaining the present invention are shown. A transmitter TX transmits in downlink frames on a carrier frequency FTX. A receiver RX receives in uplink frames on a carrier frequency FRX. Uplink and downlink frames do not overlap in time, i.e. they are distributed as in FIG. 4. This means that antennas A1 and A2 are both available for both transmission and reception. Switches SW1 and SW2 lead signals to and from either transmitter TX or receiver RX. These switches SW1, SW2 are controlled by a control signal C1 from a control unit CU-BS (e. g. implemented by a micro processor or a micro/signal processor combination executing a control program P-BS) such that transmitter TX during downlink frames receives signals on its input terminal and outputs signals to one of the antennas A1, A2 on its output terminal, and such that receiver RX during uplink frames receives signals from one of the antennas A1, A2 on its input terminal and outputs received signals for decoding on its output terminal. In FIG. 5 switches SW1, SW2 are in the switch positions that are used during downlink frames. A switch SW3, which over a control signal C2 is also controlled by control unit CU-BS, selects the appropriate antenna A1 or A2 during both transmission and reception, as will be further described below.

Figure 6:
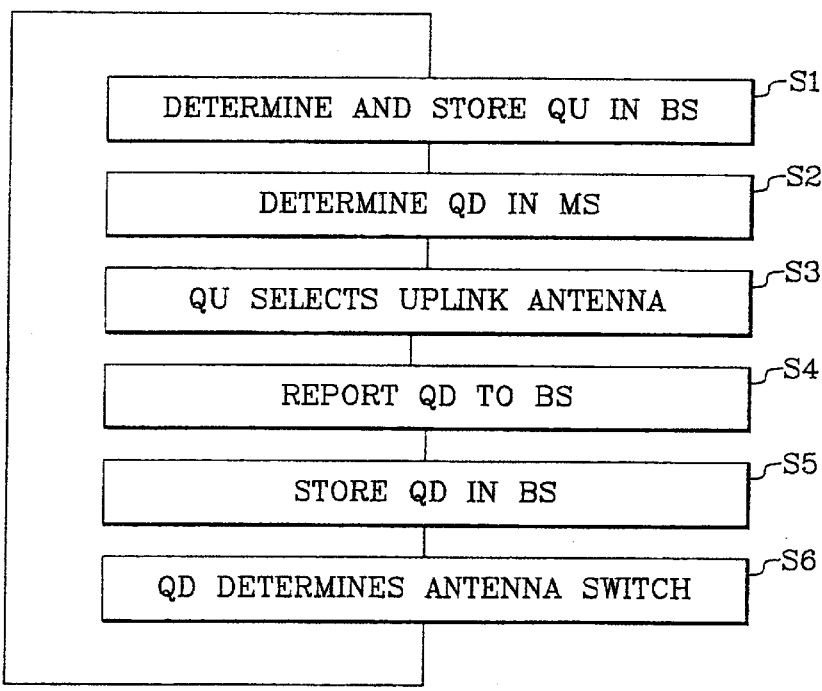
FIG. 6 is a flow chart illustrating the antenna switching diversity procedure in accordance with the present invention.

FIG. 6 is a flow chart illustrating the antenna switching diversity procedure in accordance with the present invention. In step S1 the base station in FIG. 5 receives a time slot in an uplink frame. Control unit CU-BS measures the bit error rate (BER) on antenna A1 during a part of the received burst and the bit error rate on antenna A2 during another part of the burst. The best antenna is determined by selecting the antenna having the lowest bit error rate. A corresponding antenna indicator (for example 0 for antenna A1 and 1 for antenna A2) is stored in a memory location QU in control unit CU-BS. In step S2 the mobile station, which has only one antenna, determines the received bit error rate and compares this rate to a threshold to determine an indicator QD. If the bit error rate exceeds the threshold, this indicates that the reception quality is low, and that the other antenna should be used for the next downlink burst. If the bit error rate does not exceed the threshold, this indicates that the same antenna may be used in the next downlink burst. The result of the test is stored in a memory location QD-MS (see FIG. 7) in the mobile station (for example 0 for "use same antenna" and 1 for "switch antenna"). In step S3 control unit CU-BS retrieves the value QU and selects the corresponding antenna for receiving the next burst from the mobile station. In this uplink burst the value of QD is reported to the base station in step S4. In step S5 this value is stored in a corresponding memory location QD-BS in control unit CU-BS. In step S6 the indicator QD is retrieved to determine whether an antenna switch should be performed for the next downlink burst. Thereafter the procedure is repeated.

It is noted that there is an asymmetry between base station and mobile station. The base station may actually determine the best antenna, while the mobile station only can determine if reception is "good enough" on the current antenna. Furthermore, it is also possible to use two receivers, one for each antenna, to determine the best uplink reception quality QU.

Figure 7:
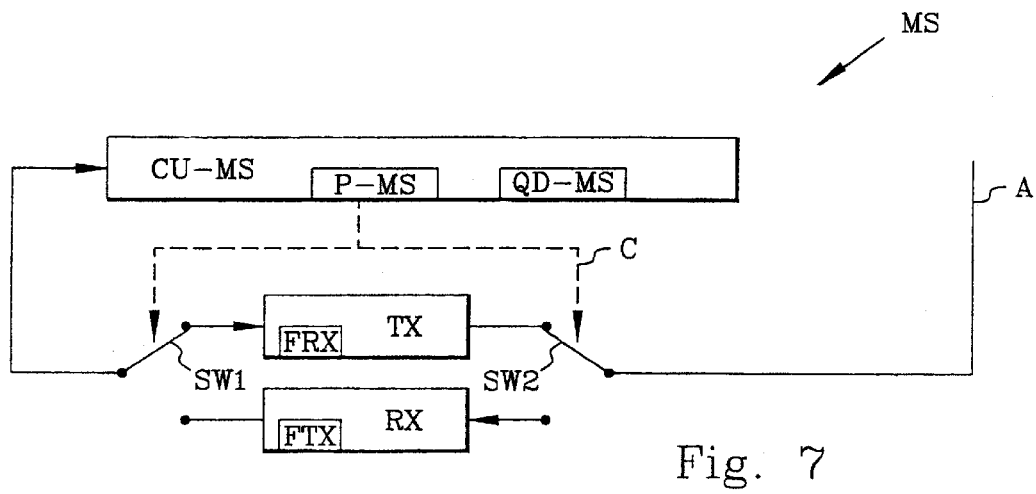
FIG. 7 is a block diagram of a mobile station in accordance with the present invention.

FIG. 7 is a block diagram of a mobile station in accordance with the present invention. Only blocks necessary to explain the present invention have been included. The block diagram of mobile station MS in FIG. 7 is quite similar to the block diagram of base station BS in FIG. 5. The mobile station also includes a control unit CU-MS (e. g. implemented by a micro/signal processor combination) controlling transmission and reception in a transmitter TX and a receiver RX by using switches SW1 and SW2, which are controlled by a control signal C. An important difference is that there is no switch SW3, since there is only one antenna A in mobile station MS. Another difference is that control unit CU-MS in a mobile station does not need a memory location for QU, since this parameter is not used by a mobile station. Furthermore, control unit CU-MS in a mobile station executes another program P-MS than control unit CU-BS in a base station (as explained with reference to FIG. 6), again due to the fact that a mobile station only has one antenna. Also note that the role of frequencies FTX and FRX have been reversed in the mobile station as compared to the base station.

Since the mobile station in FIG. 7 is based on a different timing of uplink bursts (8 instead of 3 bursts delay for the GSM case), it is not compatible with the existing GSM system. A hybrid mobile station in accordance with the present invention therefore includes a control program P-MS that is capable of operating also in the old system and switch between the two modes depending of the capabilities of the base stations. The base station typically informs the mobile station of its capabilities over a control channel.

In the above description the base station uses two antennas for antenna switching diversity. It is also possible to generalize the method by having more than two antennas, e.g. 3 or 4 antennas, to achieve antenna diversity.

Although the embodiment of frequency usage illustrated in FIG. 4 is suitable for explaining the present invention, it seems wasteful to use only 50% of the time on each carrier frequency for transmission and reception, respectively.

Figure 8:
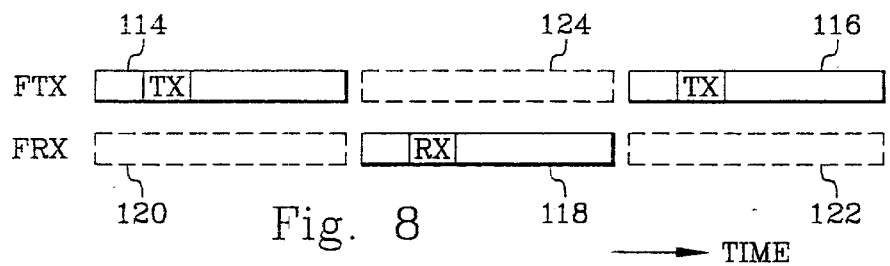
FIG. 8 schematically shows the usage of two carrier frequencies in another embodiment of a combined TDMA-TDD/FDD system.

FIG. 8 schematically shows the usage of two frequency bands in a modified combined TDMA-TDD/FDD system that eliminates this drawback. In this embodiment the dashed frames 120 and 122, 124 are also used for transmission and reception, respectively, but by another base station that is geographically separated from base station BS. By geographically separating the base stations, typically by 10 m or more, reception on one frequency by one base station will not be disturbed by transmission on another frequency by the other base station. Furthermore transmission from the two base stations is synchronized by the network controller, which also orders one of the base stations to transmit with a time delay of a downlink frame with respect to the other base station. As a generalization each base station may belong to a respective set of base stations, each base station in one set having the same timing and each base station in the other set having a timing that is delayed by a downlink frame. The mobile station is informed of the timing used by each set of base stations and uses this information to adjust its timing when it locks to a traffic channel.

Furthermore, the invention has been described with reference to a half rate channel. However, by using two or more time slots in downlink and uplink frames, the same principles may be used to implement antenna switching diversity for higher rate channels.

Figure 9:
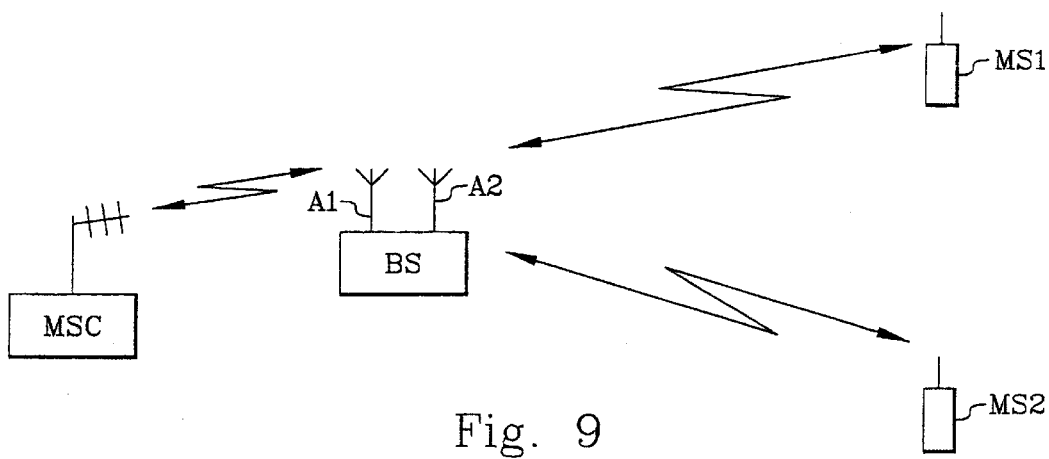
FIG. 9 schematically shows another embodiment of a cellular mobile radio communication system.

FIG. 9 schematically shows a modified cellular mobile radio communication system, in which the fixed connection between network controller MSC and Base station BS in FIG. 1 has been replaced by a radio connection. In this embodiment network controller MSC acts as a fixed radio terminal relative to base station BS. In a similar embodiment the radio terminal is a fixed radio terminal in the local loop (RLL).

It will be understood by those skilled in the art that various modifications and changes may be made to the present invention without departure from the spirit and scope thereof, which is defined by the appended claims.

I claim:

1. An antenna switching diversity method in a TDMA-FDD radio communication system including a base station and a radio terminal, said system separating transmission and reception in both time and frequency in each of said base station and said radio terminal, said method including measuring reception quality uplink for a TDMA-FDD radio channel on a set of several antennas belonging to said base station;

storing a first indicator of a best antenna from said set in said base station;

measuring reception quality downlink for said TDMA-FDD radio channel on an antenna belonging to said radio terminal;

storing a second indicator of said reception quality downlink in said radio terminal;

selecting, based on the value of said first indicator, an antenna from said set for reception uplink;

reporting said second indicator to said base station;

storing said reported second indicator in said base station; and selecting, independently from the selection of antenna for reception uplink and based on the value of said second indicator, an antenna from said set for transmission downlink.

2. A TDMA-FDD radio communication system providing antenna switching diversity and including a base station and a radio terminal, said system separating transmission and reception in both time and frequency in each of said base station and said radio terminal, said system including means for measuring reception quality uplink for a TDMA-FDD radio channel on a set of several antennas belonging to said base station;

means for storing a first indicator of a best antenna from said set in said base station;

means for measuring reception quality downlink for said TDMA-FDD radio channel on an antenna belonging to said radio terminal;

means for storing a second indicator of said reception quality downlink in said radio terminal;

means for selecting, based on the value of said first indicator, an antenna from said set for reception uplink;

means for reporting said second indicator to said base station;

means for storing said reported second indicator in said base station; and means for selecting, independently from the selection of antenna for reception uplink and based on the value of said second indicator, an antenna from said set for transmission downlink.

3. The system of claim 2, wherein said radio terminal is a mobile radio station.

4. The system of claim 2, wherein said radio terminal is a fixed network controller.

5. The system of claim 2, wherin said radio terminal is a fixed radio station in a local radio loop.

6. A base station in a TDMA-FDD radio communication system providing antenna switching diversity and including a base station and a radio terminal, said system separating transmission and reception in both time and frequency in each of said base station and said radio terminal, said base station including

- a set of several antennas;
- means for measuring reception quality uplink on antennas in said set;
- means for storing a first indicator of a best antenna in said set;
- means for selecting, based on the value of said first indicator, an antenna from said set for reception uplink;
- means for receiving a second indicator of reception quality downlink at said radio terminal in said base station;
- means for storing said reported second indicator in said base station; and
- means for selecting, independently from the selection of antenna for reception uplink and based on the value of said second indicator, an antenna from said set for transmission downlink.

7. A radio terminal in a TDMA-FDD radio communication system, including

- a control unit operating in either of two operating modes, namely
  - a downlink antenna switching mode, which
    - measures reception quality downlink on an antenna belonging to said radio terminal,
    - stores an indicator of said reception quality downlink,
    - reports said indicator to a base station for selecting, based on the value of said indicator, one of several available base station transmission antennas, and
  - a downlink single antenna mode, which accepts downlink transmission from a single antenna in said base station regardless of reception quality downlink.

8. The radio terminal of claim 7, wherein said radio terminal is a mobile radio station.

9. The radio terminal of claim 7, wherein said radio terminal is a fixed network controller.

10. The radio terminal of claim 7, wherein said radio terminal is a fixed radio station in a local radio loop.

* * * * *